(12) United States Patent
Sun et al.

(10) Patent No.: US 12,706,517 B2
(45) Date of Patent: Aug. 11, 2026

(54) POWER CONVERTER

(71) Applicant: Delta Electronics, Inc., Taoyuan City (TW)

(72) Inventors: Ke Sun, Shanghai (CN); Shaopeng Han, Shanghai (CN); Yanbing Xia, Shanghai (CN)

(73) Assignee: Delta Electronics, Inc., Taoyuan City (TW)

( * ) Notice: Subject to any disclaimer, the term of this patent is extended or adjusted under 35 U.S.C. 154(b) by 270 days.

(21) Appl. No.: 18/670,316

(22) Filed: May 21, 2024

(65) Prior Publication Data

US 2024/0396420 A1 Nov. 28, 2024

(30) Foreign Application Priority Data

May 24, 2023 (CN) ......................... 202310593454.3

(51) Int. Cl.
*H02M 7/04* (2006.01)
*H02M 1/00* (2006.01)

(52) U.S. Cl.
CPC ........... *H02M 1/0009* (2021.05); *H02M 7/04* (2013.01)

(58) Field of Classification Search
CPC ........ H02M 1/0009; H02M 7/04; H02M 3/01; H02M 3/33507
See application file for complete search history.

(56) References Cited

U.S. PATENT DOCUMENTS 11,381,153 B1 * 7/2022 Xiong ..................... H02M 1/14
11,749,442 B2 * 9/2023 Chang ............... H02M 3/33576 363/21.01
2020/0150154 A1 * 5/2020 Chang ............... H02M 3/33592
2024/0204679 A1 * 6/2024 Bakas .................. H02M 5/257

FOREIGN PATENT DOCUMENTS

| | | | |
|---|---|---|---|
| CN | 103872915 | A | 6/2014 |
| CN | 215218964 | U | 12/2021 |
| CN | 110907680 | B | 3/2022 |
| CN | 111190039 | B | 6/2022 |
| JP | H02179270 | A | 7/1990 |
| JP | 6531097 | B2 | 6/2019 |
| WO | 2022095542 | A1 | 5/2022 |

* cited by examiner

*Primary Examiner* — Adolf D Berhane
(74) *Attorney, Agent, or Firm* — Kirton McConkie; Evan R. Witt

(57) ABSTRACT

The present disclosure provides a power converter including a transformer, a first current detection circuit and a rectifier circuit. The transformer includes a primary side winding and a secondary side winding coupled to each other. The first current detection circuit is electrically connected in parallel to the secondary side winding and includes a first auxiliary winding, a first switch and a first impedance device electrically connected in series. The first auxiliary winding is coupled to the secondary side winding. The rectifier circuit includes a first bridge arm and a second bridge arm electrically connected in parallel. The first bridge arm includes a second switch and a third switch electrically connected in series, and the second bridge arm includes a fourth switch and a fifth switch electrically connected in series.

18 Claims, 10 Drawing Sheets

POWER CONVERTER

CROSS-REFERENCE TO RELATED APPLICATION

This application claims priority to China Patent Application No. 202310593454.3, filed on May 24, 2023, the entire contents of which are incorporated herein by reference for all purposes.

FIELD OF THE INVENTION

The present disclosure relates to a power converter, and more particularly to a power converter capable of detecting the output current thereof.

BACKGROUND OF THE INVENTION

The existing power supply technologies are developing in the direction of modularization, high power density and high efficiency. Since LLC circuit can achieve zero-voltage switching under entire load range, it has advantages of low switching loss, high efficiency and small circuit size, and thus the LLC circuit is widely used. However, the output current of the LLC circuit is not easy to detect, especially under low-voltage and large-current output. The conventional detection methods have problems such as large switching loss, large circuit size and inaccurate current detection.

Conventionally, there are several approaches to detect the output current of the converter. In a first approach, a resistor is disposed at the output terminal of the transformer for sampling the output current. However, large loss of resistor may be caused by the output current flowing through the resistor, and meanwhile the volume of the resistor needs to increase as the output power increases. Moreover, if the resistance of the resistor is reduced in order to reduce the loss of the resistor, the accuracy of current sampling would be reduced. In a second approach, a current transformer is electrically connected to the secondary side of the transformer for detecting the output current. However, this approach requires additional magnetic components, resulting in increment of the circuit size of the converter. In a third approach, a series branch circuit including a resistor and an auxiliary winding is electrically connected to two terminals of the secondary side winding of the transformer, and the output current of the converter is detected by measuring the voltage across the resistor. However, in this approach, one terminal of the secondary side winding must be a DC potential terminal.

Therefore, there is a need of providing a power converter to obviate the drawbacks encountered from the prior arts.

SUMMARY OF THE INVENTION

It is an object of the present disclosure to provide a power converter. In the power converter, the current detection circuit includes an auxiliary winding, a switch and an impedance device. By detecting the voltage of the impedance device, the current of the secondary side winding is derived accordingly, and the detection of the output current of the power converter is realized. Compared with the conventional approaches of detecting the output current of the power converter, the current detection circuit of the present disclosure can detect the output current of the power converter accurately with less number of electronic components. Therefore, the volume of the circuit is reduced, the space occupied by the power converter is reduced, and the loss of the power converter is decreased. In addition, in the present disclosure, one terminal of the winding of the transformer can be direct current (DC) or alternating current (AC) potential without restriction, so the applicability of the power converter is improved.

In accordance with an aspect of the present disclosure, there is provided a power converter. The power converter includes a transformer, a first current detection circuit and a rectifier circuit. The transformer includes a primary side winding and a secondary side winding coupled to each other. The first current detection circuit is electrically connected in parallel to the secondary side winding and includes a first auxiliary winding, a first switch and a first impedance device electrically connected in series. The first auxiliary winding and the secondary side winding are coupled to each other and the number of turns of the first auxiliary winding is the same as that of the secondary side winding. The rectifier circuit includes a first bridge arm and a second bridge arm electrically connected in parallel. The first bridge arm includes a second switch and a third switch electrically connected in series, and the second bridge arm includes a fourth switch and a fifth switch electrically connected in series. A first node between the second switch and the third switch is electrically connected to a first terminal of the secondary side winding, and a second node between the fourth switch and the fifth switch is electrically connected to a second terminal of the secondary side winding. The second switch and the fifth switch are turned on and off synchronously, and the third switch and the fourth switch are turned on and off synchronously. The first switch and the second switch are turned on and off synchronously, or the first switch and the third switch are turned on and off synchronously.

In accordance with an aspect of the present disclosure, there is provided a power converter. The power converter includes a transformer, a first current detection circuit and a rectifier circuit. The transformer includes a primary side winding, a first secondary side winding and a second secondary side winding coupled to each other. A first terminal of the first secondary side winding is electrically connected to a second terminal of the second secondary side winding and a positive output terminal, and the number of turns of the first secondary side winding is the same as that of the second secondary side winding. The first current detection circuit is electrically connected in parallel to the first secondary side winding and includes a first auxiliary winding, a first switch and a first impedance device electrically connected in series. The first auxiliary winding and the first secondary side winding are coupled to each other and the number of turns of the first auxiliary winding is the same as that of the first secondary side winding. The rectifier circuit includes a second switch and a third switch. A first terminal of the second switch is electrically connected to a second terminal of the first secondary side winding, and a second terminal of the second switch is electrically connected to a negative output terminal. A first terminal of the third switch is electrically connected to the first terminal of the second secondary side winding, and a second terminal of the third switch is electrically connected to the negative output terminal. The second switch and the third switch are turned on alternately, and the first switch and the second switch are turned on and off synchronously.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
FIG. 1 is a schematic circuit diagram illustrating a power converter according to a first embodiment of the present disclosure.
Figure 1:
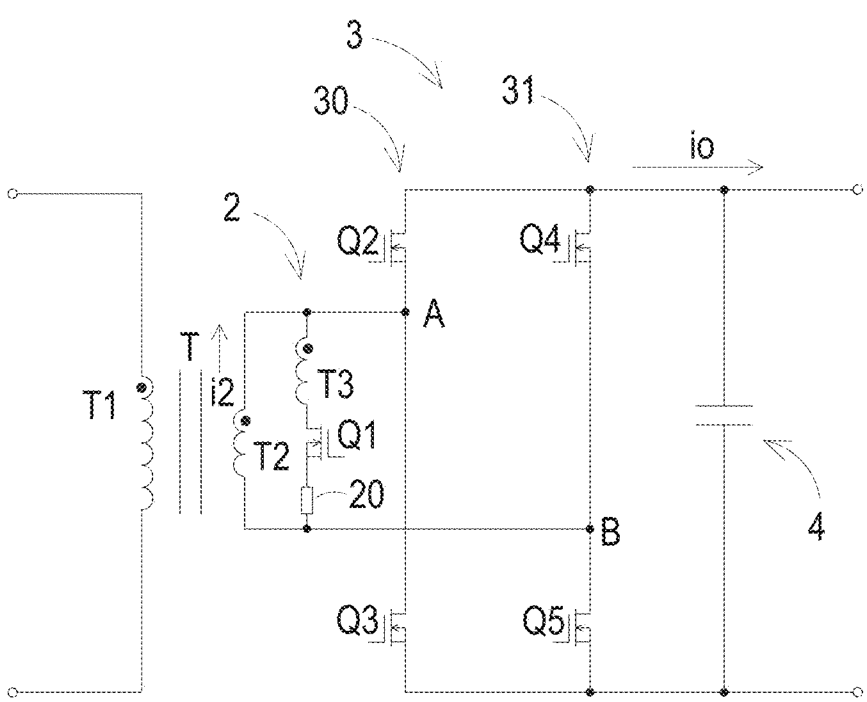

FIG. 1 is a schematic circuit diagram illustrating a power converter 1 according to a first embodiment of the present disclosure. As shown in FIG. 1, the power converter 1 of the present disclosure includes a transformer T, a first current detection circuit 2 and a rectifier circuit 3. The transformer T includes a primary side winding T1 and a secondary side winding T2 coupled to each other, and i2 is the current flowing through the secondary side winding T2. The first current detection circuit 2 is electrically connected in parallel to the secondary side winding T2 and the first current detection circuit 2 includes a first auxiliary winding T3, a first switch Q1 and a first impedance device 20 electrically connected in series. The first auxiliary winding T3 and the secondary side winding T2 are coupled to each other and the number of turns of the first auxiliary winding T3 is the same as that of the secondary side winding T2. A first terminal of the secondary side winding T2 and a first terminal of the first auxiliary winding T3 are dotted terminals.

In an embodiment, the primary side winding T1, the secondary side winding T2 and the first auxiliary winding T3 are planar windings of the printed circuit board.

Please refer to FIG. 1 again. The rectifier circuit 3 includes a first bridge arm 30 and a second bridge arm 31 electrically connected in parallel. The first bridge arm 30 includes a second switch Q2 and a third switch Q3 electrically connected in series, and the second bridge arm 31 includes a fourth switch Q4 and a fifth switch Q5 electrically connected in series. A first node A between the second switch Q2 and the third switch Q3 is electrically connected to the first terminal of the secondary side winding T2, and a second node B between the fourth switch Q4 and the fifth switch Q5 is electrically connected to the second terminal of the secondary side winding T2. In an embodiment, the power converter 1 further includes an output capacitor 4 electrically connected in parallel to the second bridge arm 31. In an embodiment, the circuit topology of the power converter includes a resonant circuit topology with the transformer, a flyback circuit topology with the transformer or a dual-flyback circuit topology with the transformer.

Figure 2:
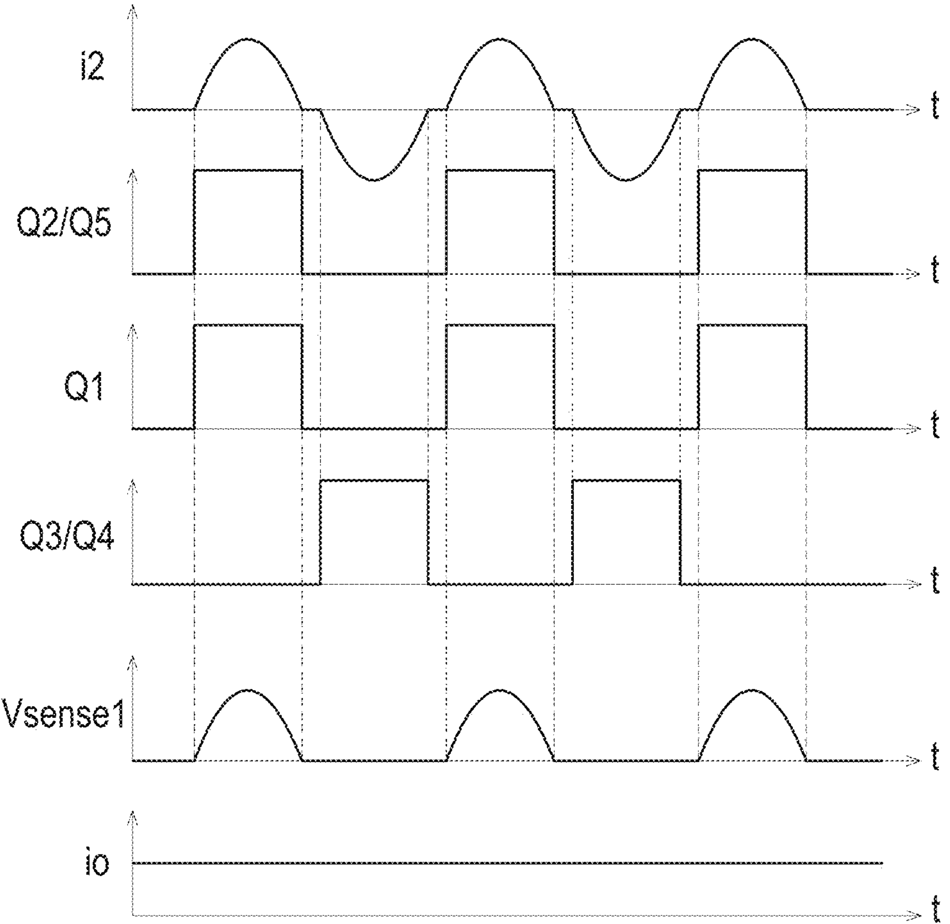
FIG. 2 schematically shows the waveforms of the voltages and currents of the power converter of FIG. 1.

Please refer to FIG. 2. FIG. 2 schematically shows the waveforms of the voltages and currents of the power converter 1 of FIG. 1. In this embodiment, the second switch Q2 and the fifth switch Q5 are turned on and off synchronously, the third switch Q3 and the fourth switch Q4 are turned on and off synchronously, and the first switch Q1 and the second switch Q2 are turned on and off synchronously. In addition, i2 is the current flowing through the secondary side winding T2, Vsense1 is the terminal voltage of the first impedance device 20, and io is the output current of the power converter 1. When the first switch Q1, the second switch Q2 and the fifth switch Q5 are turned on synchronously, the current detection circuit 2 detects a positive half cycle current of the secondary side winding T2 (i.e., the current i2 flowing from the second terminal of the secondary side winding T2 to the first terminal of the secondary side winding T2).

In an embodiment, the second switch Q2 and the fifth switch Q5 are turned on and off synchronously, the third switch Q3 and the fourth switch Q4 are turned on and off synchronously, and the first switch Q1 and the third switch Q3 are turned on and off synchronously. When the first switch Q1, the third switch Q3 and the fourth switch Q4 are turned on synchronously, the current detection circuit 2 detects a negative half cycle current of the secondary side winding T2 (i.e., the current i2 flowing from the first terminal of the secondary side winding T2 to the second terminal of the secondary side winding T2).

The resistance of the first impedance device 20 is much greater than the resistance of the DC impedance of the first auxiliary winding T3. For example, the resistance of the first impedance device 20 is 10 times greater than the resistance of the DC impedance of the first auxiliary winding T3. In an embodiment, the first impedance device 20 is a resistor with the resistance being 10 times greater than the resistance of the DC impedance of the first auxiliary winding T3. In an embodiment, the first impedance device 20 is an impedance network formed by the resistor(s) and capacitor(s) electrically connected in series.

The process of deriving the current i2 flowing through the secondary side winding T2 from the terminal voltage VT2 of the secondary side winding T2 is described as follows by taking the power converter 1 shown in FIG. 1 and the schematic waveforms of the voltages and currents of the power converter 1 shown in FIG. 2 as an example.

As shown in equation (1), when the first switch Q1 is turned on, the sum of the terminal voltage VT2 of the secondary side winding T2 and the terminal voltage VR2 of the DC impedance Rj2 of the secondary side winding T2 is equal to the sum of the terminal voltage VT3 of the first auxiliary winding T3, the terminal voltage VR3 of the DC impedance Rj3 of the first auxiliary winding T3 and the terminal voltage Vsense1 of the first impedance device 20.

$$VT2+VR2=VT3+VR3+Vsense1 \quad (1)$$

Since the secondary side winding T2 and the first auxiliary winding T3 have the dotted terminals connected to each other and the number of turns of the secondary side winding T2 is the same as that of the first auxiliary winding T3, the terminal voltage VT2 of the secondary side winding T2 is equal to the terminal voltage VT3 of the first auxiliary winding T3. In addition, since the resistance of the DC impedance Rj3 of the first auxiliary winding T3 is much smaller than the resistance of the first impedance device 20, the terminal voltage VR3 of the DC impedance Rj3 of the first auxiliary winding T3 can be ignored. In addition, since the first switch Q1 is only turned on for half a cycle, the equation (1) may be approximated as equation (2):

$$Vsense1=VR2=(i2^{*}Rj2)/2 \quad (2)$$

As shown in the equation (2), the terminal voltage Vsense1 of the first impedance device 20 is proportional to the current i2 flowing through the secondary side winding T2. In addition, the AC component of the current i2 flowing through the secondary side winding T2 is absorbed by the output capacitor 4, and the DC component of the current i2 is the output current io of the power converter 1. Therefore, the terminal voltage Vsense1 of the first impedance device 20 is proportional to the output current io of the power converter 1.

The present disclosure provides a power converter, in the power converter, the current detection circuit includes an auxiliary winding, a switch and an impedance device. By detecting the voltage of the impedance device, the current of the secondary side winding is derived accordingly, and the detection of the output current of the power converter is realized. Compared with the conventional approaches of detecting the output current of the power converter, the current detection circuit of the present disclosure can detect the output current of the power converter accurately with less number of electronic components. Therefore, the volume of the circuit is reduced, the space occupied by the power converter is reduced, and the loss of the power converter is decreased. In addition, in the present disclosure, one terminal of the winding of the transformer can be direct current (DC) or alternating current (AC) potential without restriction, so the applicability of the power converter is improved.

Figure 3:
FIG. 3 schematically shows the detailed circuit structure of the power converter of FIG. 1.
Figure 3:
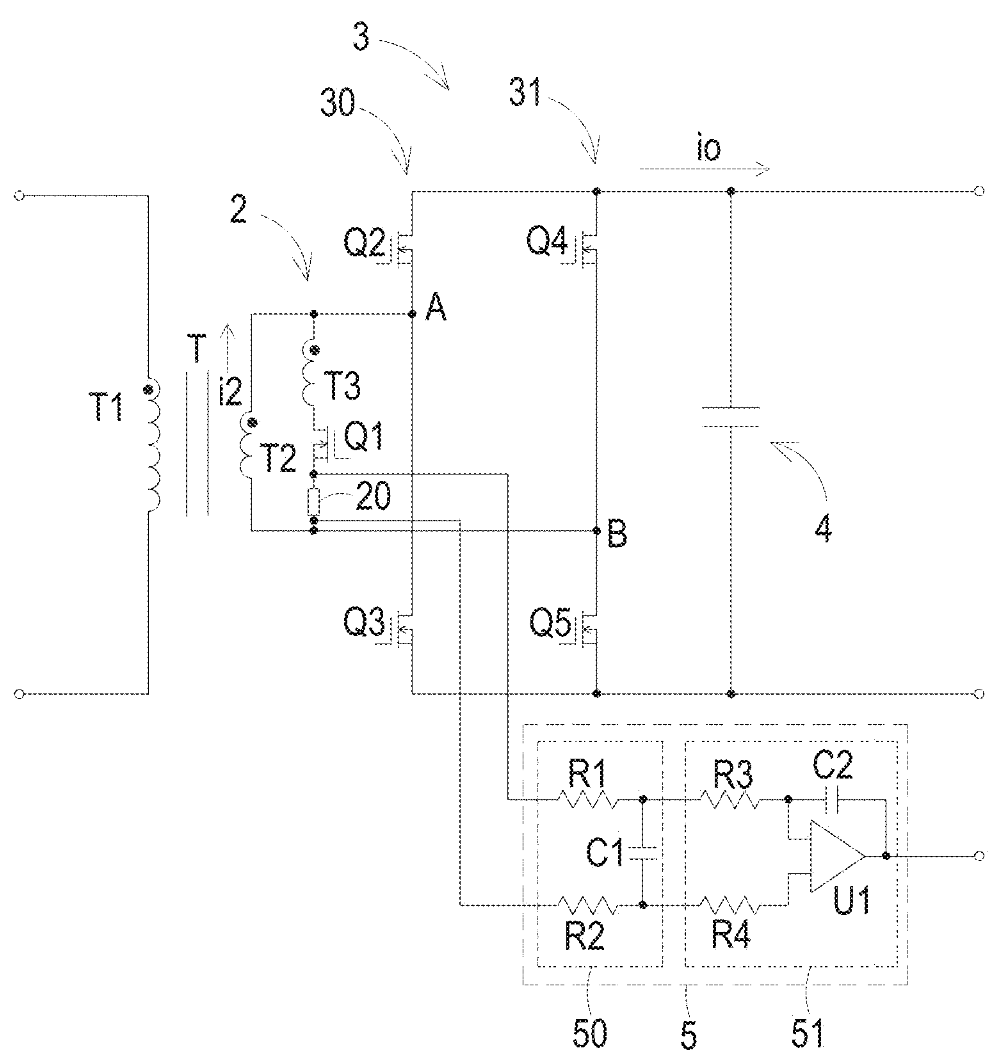

Please refer to FIG. 3. FIG. 3 schematically shows the detailed circuit structure of the power converter of FIG. 1. The current detection circuit 2 further includes a filtering and amplifying circuit 5. The filtering and amplifying circuit 5 is electrically connected in parallel to the first impedance device 20 for filtering and amplifying the terminal voltage of the first impedance device 20. The filtered and amplified terminal voltage of the first impedance device 20 is proportional to the output current io of the power converter 1. The terminal voltage of the first impedance device 20 filtered and amplified by the filtering and amplifying circuit 5 is a DC voltage, and the DC voltage may be applied for the over-current protection, current limiting protection, current control or current equalization control of the power converter 1.

The filtering and amplifying circuit 5 includes a filtering circuit 50 and an amplifying circuit 51, and the filtering circuit 50 includes a first resistor R1, a second resistor R2 and a first capacitor C1. A first terminal of the first resistor R1 is electrically connected to a first terminal of the first impedance device 20. A first terminal of the second resistor R2 is electrically connected to a second terminal of the first impedance device 20. The first capacitor C1 is electrically connected between a second terminal of the first resistor R1 and a second terminal of the second resistor R2. The amplifying circuit 51 includes an amplifier U1, a third resistor R3, a fourth resistor R4 and a second capacitor C2. A first terminal of the third resistor R3 is electrically connected to the second terminal of the first resistor R1. A second terminal of the third resistor R3 is electrically connected to an inverting input terminal of the amplifier U1. A first terminal of the fourth resistor R4 is electrically connected to the second terminal of the second resistor R2. A second terminal of the fourth resistor R4 is electrically connected to a non-inverting input terminal of the amplifier U1. Two terminals of the second capacitor C2 are electrically connected to the second terminal of the third resistor R3 and the output terminal of the amplifier U1.

Firstly, the terminal voltage Vsense1 of the first impedance device 20 is filtered by the resistors and capacitor of the filtering circuit 50, and the filtered terminal voltage is processed by the amplifying circuit 51 to obtain a voltage proportional to the average value of the output current io. The obtained voltage is namely the terminal voltage (the voltage with respect to the ground) of the output terminal of the amplifier U1, which is a DC voltage.

As shown in FIG. 3, the voltages of the inverting input terminal and the non-inverting input terminal of the amplifier U1 are AC signals. The AC component of the voltage (the voltage with respect to the ground) of one of the non-inverting input terminal and the inverting input terminal is amplified and attenuated proportionally, and is output to the output terminal of the amplifier U1.

Figure 4:
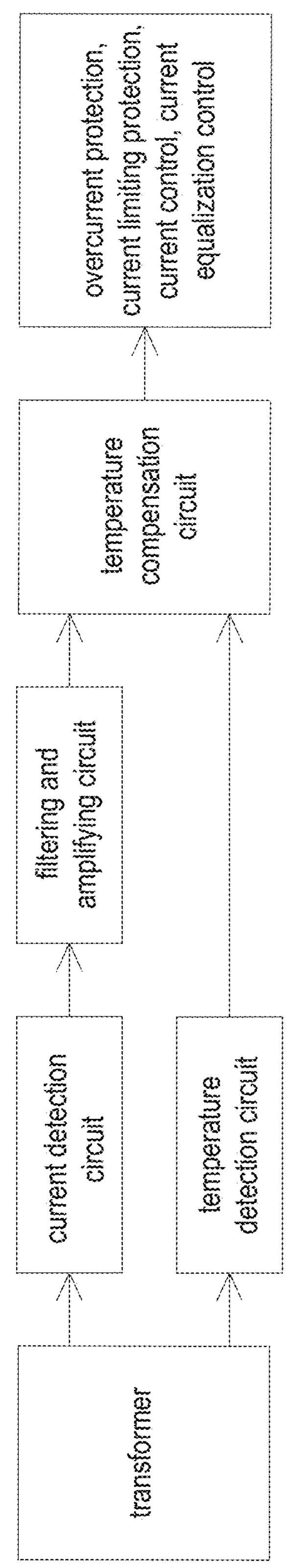
FIG. 4 is a schematic block diagram illustrating the temperature compensation performed to the current detection circuit of the power converter of FIG. 1.

FIG. 4 is a schematic block diagram illustrating the temperature compensation performed to the current detection circuit 2 of the power converter 1 of FIG. 1. Due to the increment of the temperature of transformer T caused by the heat generation of the winding of the transformer T during operation, the terminal voltage Vsense1 of the first impedance device 20 may be deviated, and the accuracy of detecting io may be reduced. As a result, when the temperature of the transformer T affects the detection accuracy of the output current io, the terminal voltage Vsense1 of the first impedance device 20 needs to be compensated to improve the detection accuracy of the output current io. In an embodiment, as shown in FIG. 4, the power converter further includes a temperature detection circuit and a temperature compensation circuit, and the temperature detection circuit is electrically connected to the transformer T for detecting the temperature of the transformer T. The temperature compensation circuit is electrically connected to the filtering and amplifying circuit 5 and the temperature detection circuit for compensating the terminal voltage of the first impedance device 20 based on the temperature detected by the temperature detection circuit.

The equation of compensating the terminal voltage of the first impedance device 20 is shown as equation (3). In equation (3), Vsense1_*t* is the terminal voltage after being compensated, t is the temperature of the winding of the transformer T during operation, T0 is the ambient temperature (for example but not limited to 25 degrees Celsius), and K1 is the temperature offset coefficient of the winding material.

$$\text{Vsense1\_t} = \text{Vsense1}/[1 + (t - T0) * K1] \quad (3)$$

The terminal voltage Vsense1_*t* after being compensated may be applied for the overcurrent protection, current limiting protection, current control or current equalization control of the power converter 1.

It should be noted that the above voltage compensation equation is adapted to the application conditions such as large current flowing through the transformer T, large temperature offset coefficient of the DC resistance of the winding or large temperature increment of the winding. In an embodiment, the equation (3) may be adjusted according to actual environmental parameters.

In an embodiment, the terminal voltage of the first impedance device 20 may be filtered and amplified through the filtering and amplifying circuit 5 shown in FIG. 3, and the temperature compensation circuit compensates the filtered and amplified terminal voltage of the first impedance device 20. The way of filtering, amplifying and compensating the terminal voltage are the same as that described above, and the detailed description thereof is omitted herein.

The transformer T and the amplifier U1 have tolerances during the manufacturing process. Therefore, the DC impedances of different transformers T and different amplifiers U1 are not the same, resulting in the deviations of the terminal voltage Vsense1 of the first impedance device 20 and the decrement of the detection accuracy of the output current io. Therefore, when the transformer T and the amplifier U1 have manufacturing tolerances, the terminal voltage Vsense1 of the first impedance device 20 needs to be calibrated to improve the detection accuracy of the output current io. In an embodiment, the power converter 1 further includes a detection and calibration circuit (not shown) configured to calibrate the terminal voltage of the first impedance device 20 based on the calibration constant of the power converter 1.

The calibration equation of the terminal voltage of the first impedance device 20 is shown as equation (4). In equation (4), Vsense1' is the calibrated terminal voltage, and K2 is the calibration constant. The calibration constant K2 equals V/I in which V is the voltage of the output terminal of the amplifier U1 and I is the constant current of the given winding.

$$Vsense1' = Vsense1 * K2 \quad (4)$$

In an embodiment, after the terminal voltage of the first impedance device 20 is calibrated, the temperature compensation circuit mentioned above compensates the calibrated terminal voltage. The way of calibrating and compensating the terminal voltage are the same as that described above, and the detailed description thereof is omitted herein.

Figure 5:
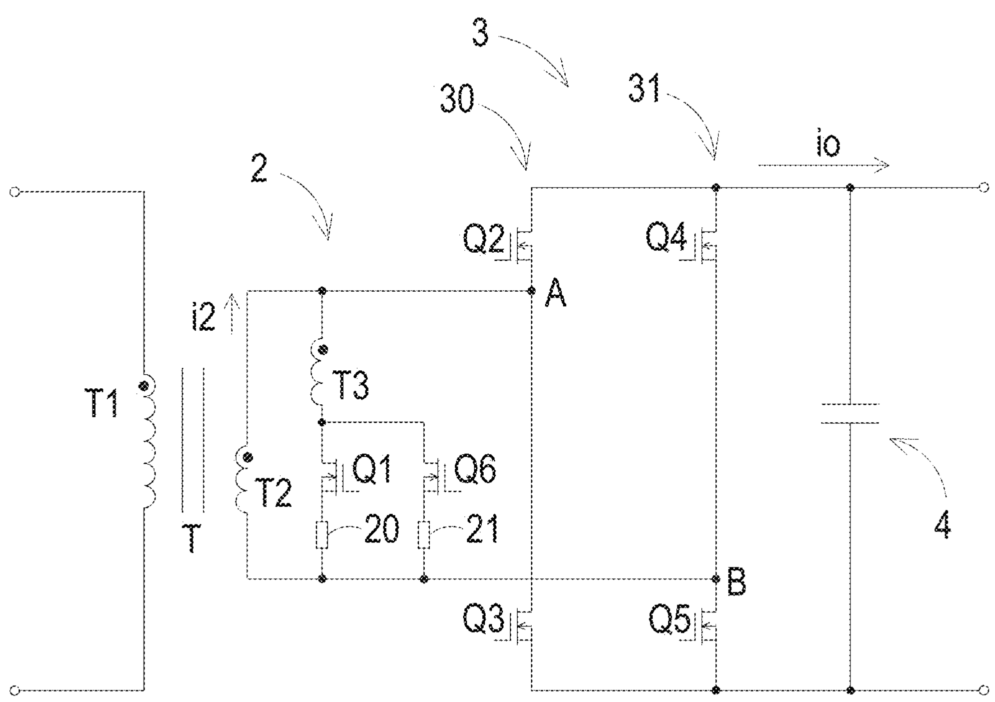
FIG. 5 is a schematic circuit diagram illustrating a power converter according to a second embodiment of the present disclosure.
Figure 6:
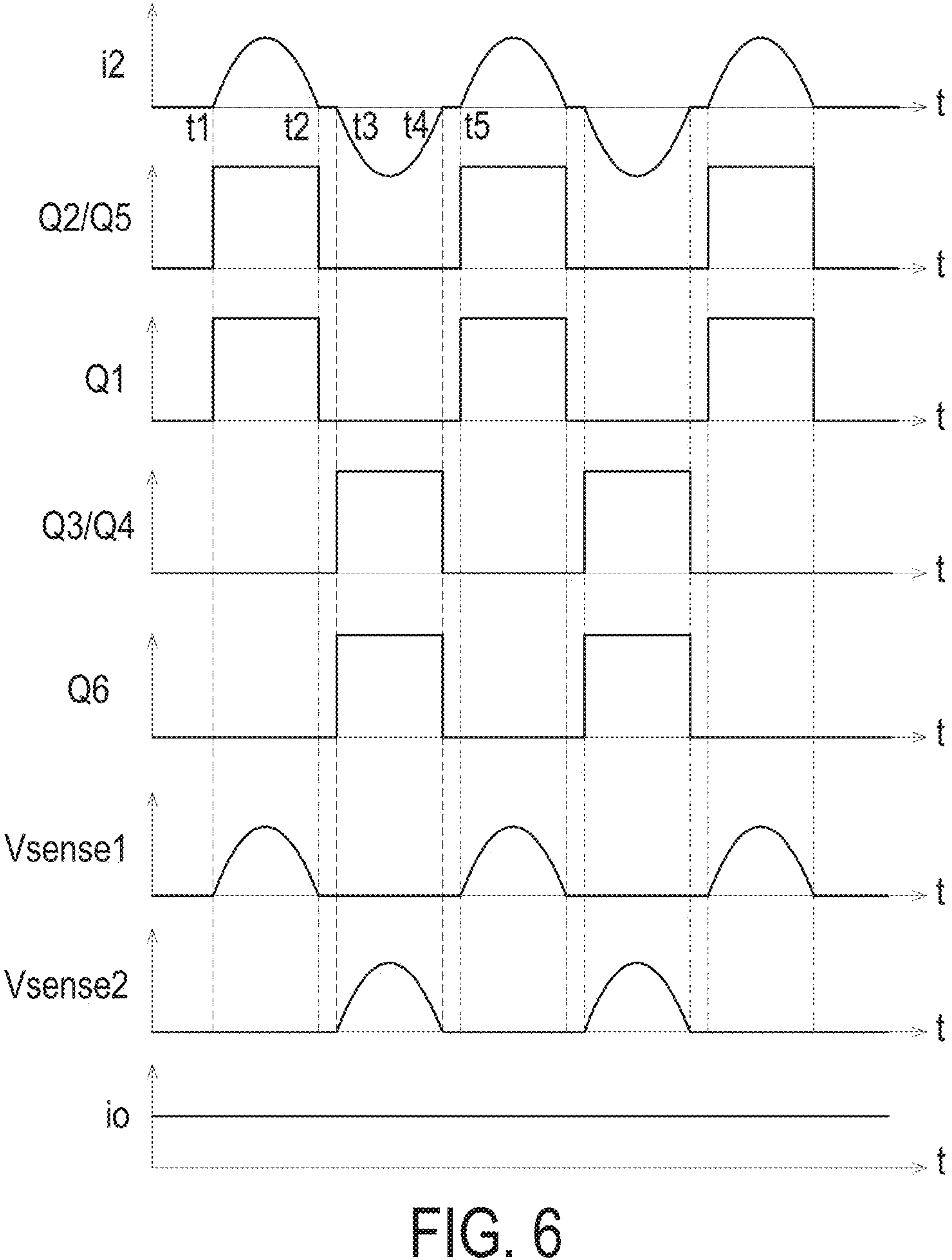
FIG. 6 schematically shows the waveforms of the voltages and currents of the power converter of FIG. 5.

FIG. 5 is a schematic circuit diagram illustrating a power converter 1*a* according to a second embodiment of the present disclosure. FIG. 6 schematically shows the waveforms of the voltages and currents of the power converter 1*a* of FIG. 5. The elements of FIG. 5 that are similar with those of FIG. 1 are represented by the same reference numerals, and the detailed description thereof is omitted herein. Please refer to FIGS. 5 and 6, in this embodiment, a first series structure composed of the first switch Q1 and the first impedance device 20 electrically connected in series is electrically connected in series to the first auxiliary winding T3. The first current detection circuit 2 further includes a second series structure, the second series structure is electrically connected in parallel to the first series structure, and the second series structure includes a sixth switch Q6 and a second impedance device 21 electrically connected in series.

In this embodiment, the first switch Q1, the second switch Q2 and the fifth switch Q5 are turned on and off synchronously, and the third switch Q3, the fourth switch Q4 and the sixth switch Q6 are turned on and off synchronously.

In an embodiment, the first impedance device 20 is the same as the second impedance device 21. For example, the resistance of the first impedance device 20 is equal to the resistance of the second impedance device 21. The resistance of the second impedance device 21 is much greater than the resistance of the DC impedance of the first auxiliary winding T3. For example, the resistance of the first impedance device 20 is 10 times greater than the resistance of the DC impedance of the first auxiliary winding T3. In an embodiment, the second impedance device 21 is a resistor with the resistance being 10 times greater than the resistance of the DC impedance of the first auxiliary winding T3. In an embodiment, the second impedance device 21 is an impedance network formed by the resistor(s) and the capacitor(s) electrically connected in series.

The terminal voltage Vsense2 of the second impedance device 21 is proportional to the current i2 flowing through the secondary side winding T2. The derivation way of the terminal voltage Vsense2 of the second impedance device 21 is similar to the derivation way of the terminal voltage Vsense1 of the first impedance device 20 shown in equation (2), and the detailed description thereof is omitted herein.

Please refer to FIGS. 5 and 6 again, the period from time t1 to t5 is one switching cycle of the power converter 1*a*. During the period from time t1 to t2, the first switch Q1, the second switch Q2 and the fifth switch Q5 are turned on, and the third switch Q3, the fourth switch Q4 and the sixth switch Q6 are turned off. Meanwhile, the terminal voltage Vsense2 of the second impedance device 21 is zero because there is no current flowing through the second impedance device 21. During the period from time t3 to t4, the first switch Q1, the second switch Q2 and the fifth switch Q5 are turned off, and the third switch Q3, the fourth switch Q4 and the sixth switch Q6 are turned on. Meanwhile, the terminal voltage Vsense1 of the first impedance device 20 is zero because there is no current flowing through the first impedance device 20. In this embodiment, the terminal voltage Vsense of the first impedance device 20 is out of phase with respect to the terminal voltage Vsense2 of the second impedance device 21 by 180 degrees. The AC component of the current i2 flowing through the secondary side winding T2 is absorbed by the output capacitor 4, and the DC component of the current i2 is the output current io of the power converter 1*a*. In this embodiment, a signal proportional to the full-cycle output current io is obtained by amplifying and computing the terminal voltages Vsense1 and Vsense2 through the amplifying circuit, so the detection accuracy and detection speed are further improved.

Figure 7:
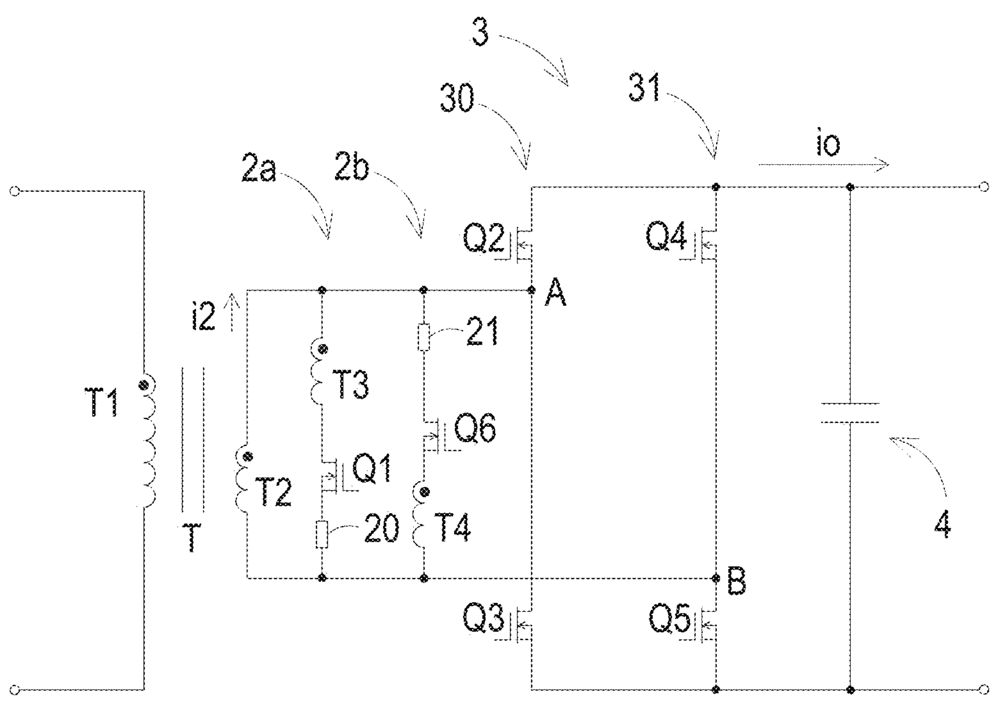
FIG. 7 is a schematic circuit diagram illustrating a power converter according to a third embodiment of the present disclosure.

FIG. 7 is a schematic circuit diagram illustrating a power converter 1*b* according to a third embodiment of the present disclosure. The elements of FIG. 7 that are similar with those of FIGS. 1 and 5 are represented by the same reference numerals, and the detailed description thereof is omitted herein. Please refer to FIG. 7, in this embodiment, the power converter 1*b* includes two current detection circuits electrically connected in parallel, which are a first current detection circuit 2*a* and a second current detection circuit 2*b*. The first current detection circuit 2*a* includes the first switch Q1, the first impedance device 20 and the first auxiliary winding T3 electrically connected in series. The second current detection circuit 2*b* includes the sixth switch Q6, the second impedance device 21 and the second auxiliary winding T4 electrically connected in series. The first auxiliary winding T3 and the secondary side winding T2 are coupled to each other and have the same number of turns. The second auxiliary winding T4 and the secondary side winding T2 are coupled to each other and have the same number of turns. The first terminal of the secondary side winding T2 and the first terminal of the first auxiliary winding T3 are dotted terminals. The first terminal of the secondary side winding T2 and the first terminal of the second auxiliary winding T4 are dotted terminals.

In this embodiment, the first switch Q1, the second switch Q2 and the fifth switch Q5 are turned on and off synchronously, and the third switch Q3, the fourth switch Q4 and the sixth switch Q6 are turned on and off synchronously.

In an embodiment, the first auxiliary winding T3 is the same as the second auxiliary winding T4. For example, the resistance of the DC impedance of the first auxiliary winding T3 is equal to the resistance of the DC impedance of the second auxiliary winding T4. The resistance of the first impedance device 20 is much greater than the resistance of the DC impedance of the first auxiliary winding T3, and the resistance of the second impedance device 21 is much greater than the resistance of the DC impedance of the second auxiliary winding T4. For example, the resistance of the second impedance device 21 is 10 times greater than the resistance of the DC impedance of the second auxiliary winding T4. In an embodiment, the first impedance device 20 and the second impedance device 21 are resistors with the resistance being 10 times greater than the resistance of the DC impedance of the corresponding auxiliary windings. In an embodiment, the first impedance device 20 and the second impedance device 21 are impedance network formed by the resistor(s) and capacitor(s) electrically connected in series.

The terminal voltage Vsense2 of the second impedance device 21 is proportional to the current i2 flowing through the secondary side winding T2. The derivation way of the terminal voltage Vsense2 of the second impedance device 21 is similar to the derivation way of the terminal voltage Vsense1 of the first impedance device 20 shown in equation (2), and the detailed description thereof is omitted herein.

The waveforms of the voltage and current shown in FIG. 6 are also applicable for the power converter 1*b* shown in FIG. 7. As shown in FIGS. 6 and 7, the period from time t1 to t5 is one switching cycle of the power converter 1*b*. During the period from time t1 to t2, the first switch Q1, the second switch Q2 and the fifth switch Q5 are turned on, and the third switch Q3, the fourth switch Q4 and the sixth switch Q6 are turned off. Meanwhile, the terminal voltage Vsense2 of the second impedance device 21 is zero because there is no current flowing through the second impedance device 21. During the period from time t3 to t4, the first switch Q1, the second switch Q2 and the fifth switch Q5 are turned off, and the third switch Q3, the fourth switch Q4 and the sixth switch Q6 are turned on. Meanwhile, the terminal voltage Vsense1 of the first impedance device 20 is zero because there is no current flowing through the first impedance device 20. In this embodiment, the terminal voltage Vsense1 of the first impedance device 20 is out of phase with respect to the terminal voltage Vsense2 of the second impedance device 21 by 180 degrees. The AC component of the current i2 flowing through the secondary side winding T2 is absorbed by the output capacitor 4, and the DC component of the current i2 is the output current io of the power converter 1*b*. In this embodiment, a signal proportional to the full-cycle output current io is obtained by amplifying and computing the terminal voltages Vsense1 and Vsense2 through the amplifying circuit, so the detection accuracy and detection speed are further improved.

Figure 8:
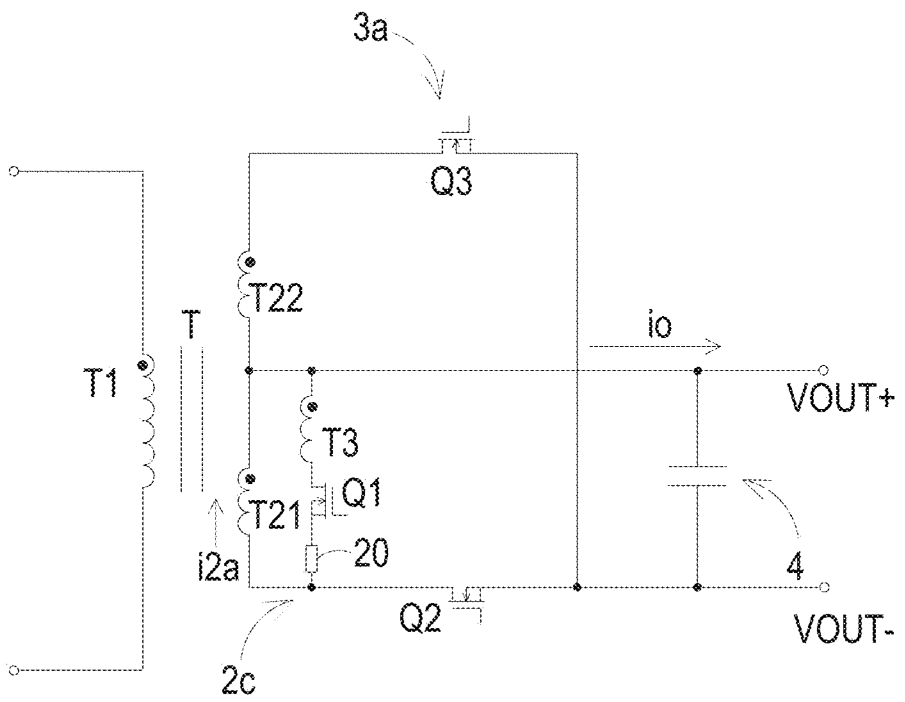
FIG. 8 is a schematic circuit diagram illustrating a power converter according to a fourth embodiment of the present disclosure.
Figure 9:
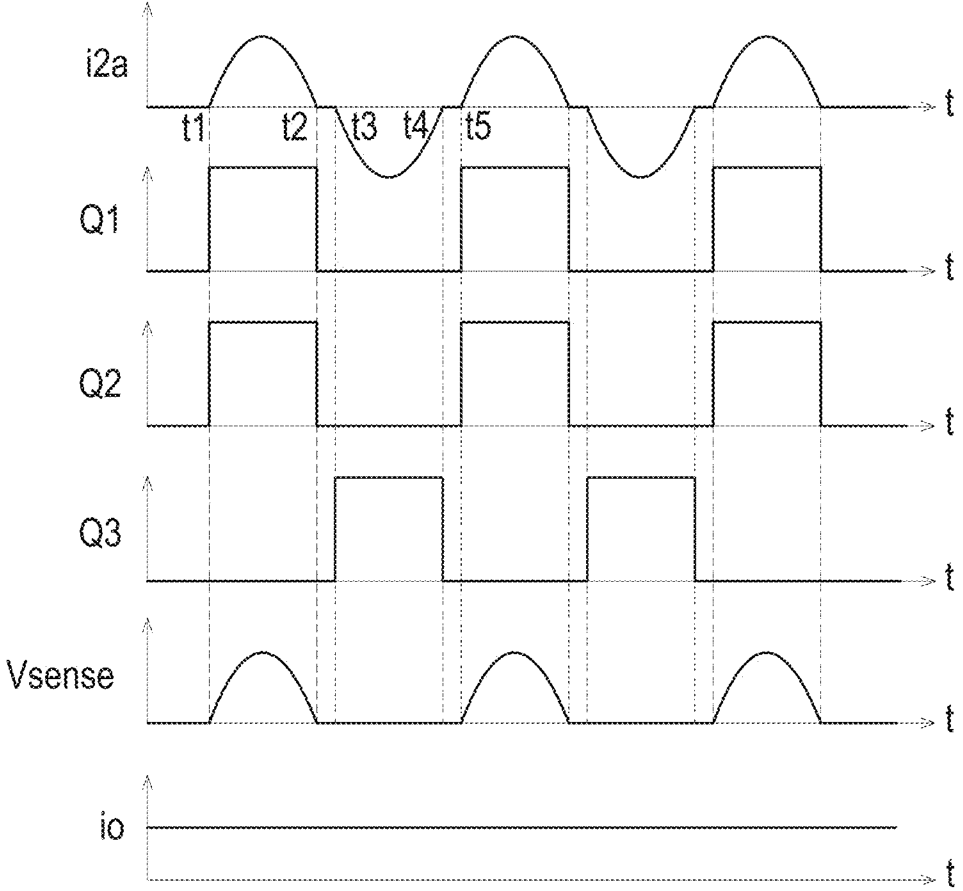
FIG. 9 schematically shows the waveforms of the voltages and currents of the power converter of FIG. 8.

FIG. 8 is a schematic circuit diagram illustrating a power converter 1*c* according to a fourth embodiment of the present disclosure. FIG. 9 schematically shows the waveforms of the voltages and currents of the power converter 1*c* of FIG. 8.

As shown in FIG. 8, the power converter 1*c* includes a transformer T, a first current detection circuit 2*c* and a rectifier circuit 3. The transformer T includes a primary side winding T1, a first secondary side winding T21 and a second secondary side winding T22 coupled to each other. A first terminal of the first secondary side winding T21 is electrically connected to a second terminal of the second secondary side winding T22 and a positive output terminal VOUT+, and the first secondary side winding T21 and the second secondary side winding T22 have the same number of turns. The first current detection circuit 2*c* is electrically connected in parallel to the first secondary side winding T21 and includes a first auxiliary winding T3, a first switch Q1 and a first impedance device 20 electrically connected in series.

In this embodiment, the first auxiliary winding T3 and the first secondary side winding T21 are coupled to each other and have the same number of turns. The rectifier circuit 3*a* includes a second switch Q2 and a third switch Q3. A first terminal of the second switch Q2 is electrically connected to a second terminal of the first secondary side winding T21, and a second terminal of the second switch Q2 is electrically connected to a negative output terminal VOUT−. A first terminal of the third switch Q3 is electrically connected to the first terminal of the second secondary side winding T22, and a second terminal of the third switch Q3 is electrically connected to the negative output terminal VOUT−. The first terminal of the first secondary side winding T21 and the first terminal of the second secondary side winding T21 are dotted terminals. The first terminal of the first secondary side winding T21 and the first terminal of the first auxiliary winding T3 are dotted terminals. The first secondary side winding T21 and the second secondary side winding T22 have the same number of turns, and the first secondary side winding T21 and the first auxiliary winding T3 have the same number of turns. In addition, i2*a* is the current flowing through the first secondary side winding T2, where i2*a*=io/2.

Please refer to FIG. 9, the period from time t1 to t5 is one switching cycle of the power converter 1*c*. During the period from time t1 to t2, the first switch Q1 and the second switch Q2 are turned on, and the third switch Q3 is turned off. In addition, i2*a* is the current flowing through the first secondary side winding T21, Vsense1 is the terminal voltage of the first impedance device 20, and io is the output current of the power converter 1*c*. When the first switch Q1 and the second switch Q2 are turned on synchronously, the first detection circuit 2*c* detects the circuit flowing through the first secondary side winding T21. Since the AC component of the current i2*a* is absorbed by the output capacitor 4, the terminal voltage Vsense1 of the first impedance device 20 is proportional to the current i2*a*, and the DC component of the current i2*a* is half of the output current io of the power converter 1*c*. In this embodiment, the terminal voltages and currents relationship of the first auxiliary winding T3 and the first secondary side winding T21 are similar as above, and the detailed description thereof is omitted herein.

In an embodiment, the first current detection circuit 2*c* may be electrically connected in parallel to two terminals of the second secondary side winding. Meanwhile, the first switch Q1 and the third switch Q3 are turned on synchronously, and the first detection circuit 2*c* detects the circuit flowing through the second secondary side winding T22.

Figure 10:
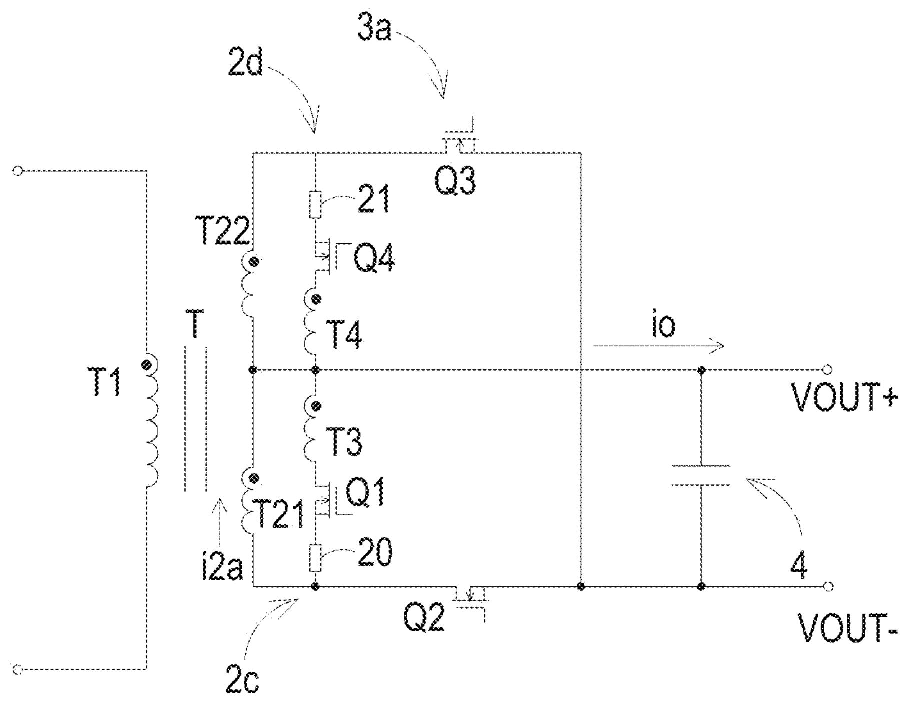
FIG. 10 is a schematic circuit diagram illustrating a power converter according to a fifth embodiment of the present disclosure.

FIG. 10 is a schematic circuit diagram illustrating a power converter 1*d* according to a fifth embodiment of the present disclosure. Please refer to FIG. 10, in this embodiment, the power converter 1*d* includes two current detection circuits electrically connected in parallel, which is a first current detection circuit 2*c* and a second current detection circuit 2*d*. The first current detection circuit 2*c* includes the first auxiliary winding T3, the first switch Q1 and the first impedance device 20 electrically connected in series. The second current detection circuit 2*d* includes the second auxiliary winding T4, the fourth switch Q4 and the second impedance device 21 electrically connected in series. The first current detection circuit 2*c* is electrically connected in parallel to the first secondary side winding T21, and the second current detection circuit 2*d* is electrically connected in parallel to the second secondary side winding T22. The first switch Q1 and the second switch Q2 are turned on and off synchronously, and the third switch Q3 and the fourth switch Q4 are turned on and off synchronously. The first current detection circuit 2*c* and the second current detection circuit 2*d* detect the current flowing through the first secondary side winding T21 and the second secondary side winding T22 respectively, so as to improve the detection accuracy.

From the above descriptions, the present disclosure provides a power converter, in the power converter, the current detection circuit includes an auxiliary winding, a switch and an impedance device. By detecting the voltage of the impedance device, the current of the secondary side winding is derived accordingly, and the detection of the output current of the power converter is realized. Compared with the conventional approaches of detecting the output current of the power converter, the current detection circuit of the present disclosure can detect the output current of the power converter accurately with less number of electronic components. Therefore, the volume of the circuit is reduced, the space occupied by the power converter is reduced and the loss of the power converter is decreased. In addition, in the present disclosure, one terminal of the winding of the transformer can be direct current (DC) or alternating current (AC) potential without restriction, so the applicability of the power converter is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power converter, comprising:

a transformer, comprising a primary side winding and a secondary side winding coupled to each other;

a first current detection circuit, electrically connected in parallel to the secondary side winding, and the first current detection circuit comprises a first auxiliary winding, a first switch and a first impedance device electrically connected in series, wherein the first auxiliary winding and the secondary side winding are coupled to each other and the number of turns of the first auxiliary winding is the same as that of the secondary side winding, a rectifier circuit, comprising a first bridge arm and a second bridge arm electrically connected in parallel, wherein the first bridge arm comprises a second switch and a third switch electrically connected in series, and the second bridge arm comprises a fourth switch and a fifth switch electrically connected in series, wherein a first node between the second switch and the third switch is electrically connected to a first terminal of the secondary side winding, and a second node between the fourth switch and the fifth switch is electrically connected to a second terminal of the secondary side winding, wherein the second switch and the fifth switch are turned on and off synchronously, and the third switch and the fourth switch are turned on and off synchronously, wherein the first switch and the second switch are turned on and off synchronously, or the first switch and the third switch are turned on and off synchronously.

2. The power converter according to claim 1, wherein when the first switch, the second switch and the fifth switch are turned on synchronously, the current detection circuit detects a positive half cycle current of the secondary side winding.

3. The power converter according to claim 1, wherein when the first switch, the third switch and the fourth switch are turned on synchronously, the current detection circuit detects a negative half cycle current of the secondary side winding.

4. The power converter according to claim 1, further comprising an output capacitor electrically connected in parallel to the second bridge arm.

5. The power converter according to claim 1, wherein a terminal voltage of the first impedance device is proportional to a current flowing through the secondary side winding.

6. The power converter according to claim 1, wherein the first impedance device is a resistor, and a resistance of the resistor is 10 times greater than a resistance of a DC impedance of the first auxiliary winding.

7. The power converter according to claim 1, wherein the first impedance device is an impedance network formed by a resistor and a capacitor electrically connected in series.

8. The power converter according to claim 1, wherein the current detection circuit further comprises a filtering and amplifying circuit, and the filtering and amplifying circuit is electrically connected in parallel to the first impedance device, and the filtering and amplifying circuit is configured for filtering and amplifying a terminal voltage of the first impedance device, and the filtered and amplified terminal voltage of the first impedance device is proportional to an output current of the power converter.

9. The power converter according to claim 8, wherein the filtering and amplifying circuit comprises a filtering circuit and an amplifying circuit, the filtering circuit comprises a first resistor, a second resistor and a first capacitor, a first terminal of the first resistor is electrically connected to a first terminal of the first impedance device, a first terminal of the second resistor is electrically connected to a second terminal of the first impedance device, the first capacitor is electrically connected between a second terminal of the first resistor and a second terminal of the second resistor, the amplifying circuit comprises an amplifier, a third resistor, a fourth resistor and a second capacitor, a first terminal of the third resistor is electrically connected to the second terminal of the first resistor, a second terminal of the third resistor is electrically connected to an inverting input terminal of the amplifier, a first terminal of the fourth resistor is electrically connected to the second terminal of the second resistor, a second terminal of the fourth resistor is electrically connected to a non-inverting input terminal of the amplifier respectively, and two terminals of the second capacitor are electrically connected to the second terminal of the third resistor and an output terminal of the amplifier respectively.

10. The power converter according to claim 1, further comprising:

a temperature detection circuit electrically connected to the transformer for detecting the temperature of the transformer; and a temperature compensation circuit electrically connected to the temperature detection circuit and the filtering and amplifying circuit, wherein the temperature compensation circuit compensates a terminal voltage of the first impedance device based on the temperature detected by the temperature detection circuit.

11. The power converter according to claim 1, further comprising a detection and calibration circuit configured for calibrating a terminal voltage of the first impedance device based on a calibration constant of the power converter.

12. The power converter according to claim 1, wherein a first terminal of the secondary side winding and a first terminal of the first auxiliary winding are dotted terminals.

13. The power converter according to claim 1, wherein the circuit topology of the power converter comprises a resonant circuit topology with the transformer, a flyback circuit topology with the transformer or a dual-flyback circuit topology with the transformer.

14. The power converter according to claim 1, wherein a first series structure composed of the first switch and the first impedance device electrically connected in series is electrically connected in series to the first auxiliary winding, the first current detection circuit further comprises a second series structure, wherein the second series structure is electrically connected in parallel to the first series structure, and the second series structure comprises a sixth switch and a second impedance device electrically connected in series, wherein the first switch and the second switch are turned on and off synchronously, and the third switch and the sixth switch are turned on and off synchronously.

15. The power converter according to claim 14, wherein the first impedance device is the same as the second impedance device.

16. The power converter according to claim 1, further comprising:

a second current detection circuit, comprising a second auxiliary winding, a sixth switch, a second impedance device electrically connected in series, wherein the second auxiliary winding and the secondary side winding are coupled to each other, and the number of turns of the second auxiliary winding is the same as that of the secondary side winding, wherein the first switch, the second switch and the fifth switch are turned on and off synchronously, and the third switch, the fourth switch and the sixth switch are turned on and off synchronously.

17. A power converter, comprising:

a transformer, comprising a primary side winding, a first secondary side winding and a second secondary side winding coupled to each other, wherein a first terminal of the first secondary side winding is electrically connected to a second terminal of the second secondary side winding and a positive output terminal, and the number of turns of the first secondary side winding is the same as that of the second secondary side winding, a first current detection circuit, electrically connected in parallel to the first secondary side winding, and comprising a first auxiliary winding, a first switch and a first impedance device electrically connected in series, wherein the first auxiliary winding and the first secondary side winding are coupled to each other, and the number of turns of the first auxiliary winding is the same as that of the first secondary side winding; and a rectifier circuit, comprising a second switch and a third switch, wherein a first terminal of the second switch is electrically connected to a second terminal of the first secondary side winding, and a second terminal of the second switch is electrically connected to a negative output terminal, a first terminal of the third switch is electrically connected to a first terminal of the second secondary side winding, and a second terminal of the third switch is electrically connected to the negative output terminal, wherein the second switch and the third switch are turned on alternately, and the first switch and the second switch are turned on and off synchronously.

18. The power converter according to claim 17, further comprising:

a second current detection circuit, electrically connected in parallel to the second secondary side winding, and comprising a second auxiliary winding, a fourth switch and a second impedance device electrically connected in series, wherein the third switch and the fourth switch are turned on and off synchronously.

* * * * *